(12) United States Patent
Inoue et al.

(10) Patent No.: US 7,369,206 B2
(45) Date of Patent: May 6, 2008

(54) METHOD FOR MANUFACTURING LIQUID CRYSTAL DISPLAY DEVICE

(75) Inventors: Daisuke Inoue, Kanagawa (JP); Hideki Ito, Kanagawa (JP); Hiromitsu Tanaka, Izumi (JP); Takashi Kamino, Izumi (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 522 days.

(21) Appl. No.: 11/151,349

(22) Filed: Jun. 14, 2005

(65) Prior Publication Data

US 2005/0275786 A1   Dec. 15, 2005

(30) Foreign Application Priority Data

Jun. 14, 2004   (JP)   ............... 2004-175584

(51) Int. Cl.
   *G02F 1/1339*   (2006.01)
(52) U.S. Cl. ............... 349/153; 349/190; 349/155
(58) Field of Classification Search ............ 349/153, 349/190, 155
   See application file for complete search history.

(56) References Cited

U.S. PATENT DOCUMENTS

| | | | |
|---|---|---|---|
| 6,285,417 B1 * | 9/2001 | Ahn et al. ............... 349/23 |
| 7,102,726 B2 * | 9/2006 | Byun et al. ............... 349/189 |
| 2003/0223030 A1 * | 12/2003 | Byun et al. ............... 349/187 |
| 2004/0001177 A1 * | 1/2004 | Byun et al. ............... 349/187 |
| 2006/0061727 A1 * | 3/2006 | Otani ............... 349/190 |

FOREIGN PATENT DOCUMENTS

JP   11-326922   11/1999

* cited by examiner

*Primary Examiner*—Mike Qi
(74) *Attorney, Agent, or Firm*—Young & Thompson

(57) ABSTRACT

A sealing member is formed on a glass substrate, and dropping points are arranged in the form of a matrix in the region surrounded by the sealing member. The dropping points arranged in the outermost columns and the second outermost columns are connected respectively to imagine first straight lines and second straight lines. Third straight lines are imagined to be equidistant from the first straight lines and the second straight lines. The positions of the dropping points are determined in such a manner that the density of the dropping points in four edge divided regions can be 0.9 to 1.1 times the density of the dropping points in the region as a whole, and the density of the dropping points in four corner divided regions can be 0.83 to 1.17 times the density of the dropping points in the region as a whole.

9 Claims, 5 Drawing Sheets

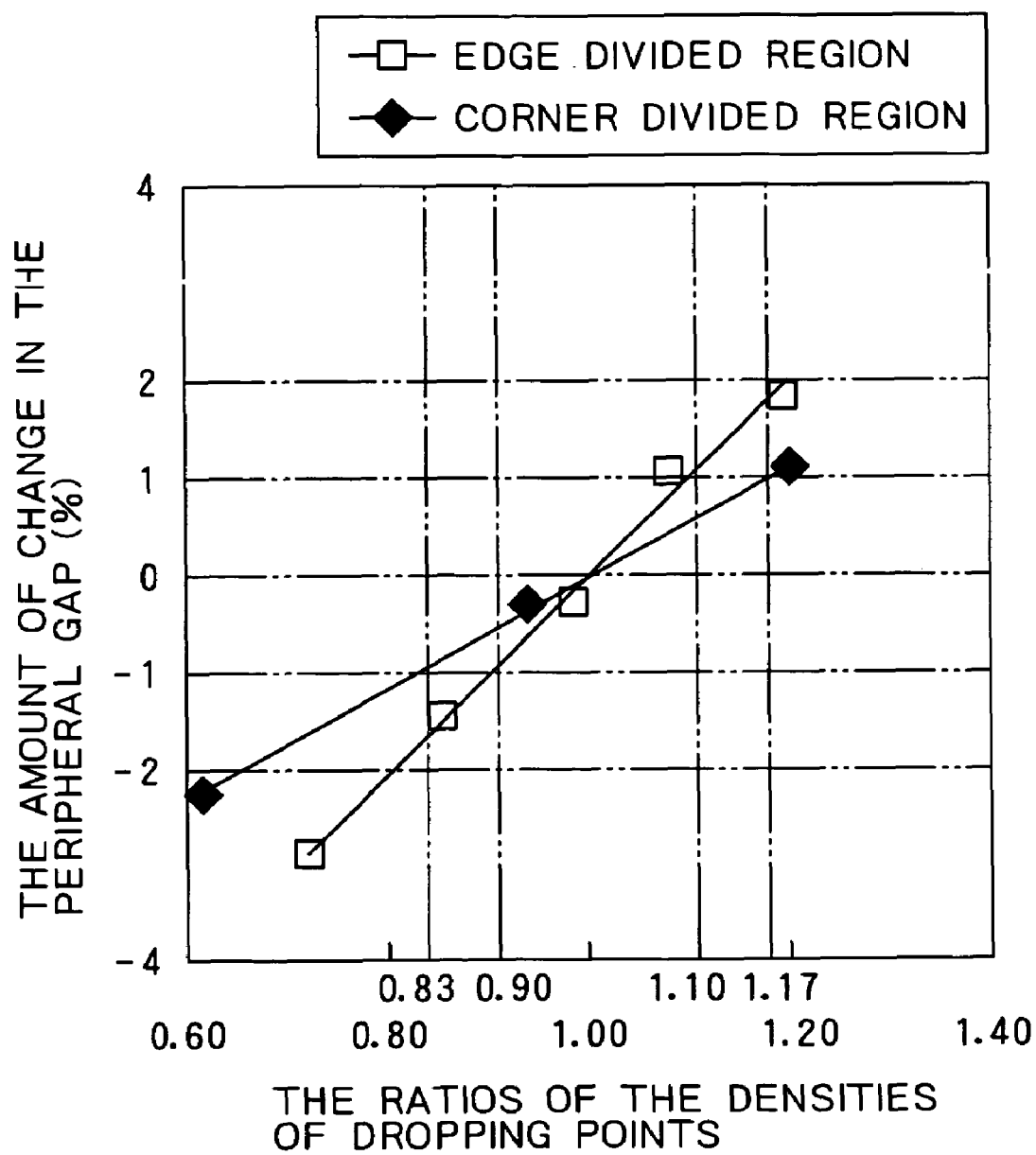

METHOD FOR MANUFACTURING LIQUID CRYSTAL DISPLAY DEVICE

BACKGROUND OF THE INVENTION

1. Field of the Invention

The present invention relates to a method for manufacturing a liquid crystal display device by an One Drop Fill process, and more specifically, to a method for manufacturing a liquid crystal display device which has two substrates opposed to each other with spacers disposed therebetween to form a fixed gap and which also has a liquid crystal layer disposed between these substrates.

2. Description of the Related Art

As disclosed in Japanese Patent Publication No. H11-326922 for example, an ODF process (One Drop Fill process) has been conventionally used to manufacture liquid crystal display devices. The ODF process disclosed in this patent document will be described as follows. FIG. 1 is a plan view showing a conventional method for manufacturing the liquid crystal display device by the ODF process. In FIG. 1, an active matrix substrate is in the process of being manufactured.

As shown in FIG. 1, first, scan lines, data lines and pixel circuits (not shown) including TFTs (Thin Film Transistors) and the like are formed on a surface of a glass substrate 101 to prepare an active matrix substrate 110. Then, rectangular frame-like sealing members 102 and 103 are formed doubly on the surface of the active matrix substrate 110 that has the pixel circuit thereon. The sealing members 102 and 103 can be made of, e.g. an ultraviolet curable resin. The sealing member 102, which is inside the sealing member 103, is formed so as to surround the display region of the liquid crystal display device. Between the inner sealing member 102 and the outer sealing member 103 is formed of a ring-like region 104. Then, liquid crystal 106 is dropped in a region 105 which is inside the sealing member 102.

On the other hand, a color filter (CF), a black matrix and the like are formed on a surface of another glass substrate to prepare a color filter substrate (not shown). The color filter is provided with a plurality of pillar-like spacers thereon.

Then, in a vacuum, the color filter substrate is superimposed on the active matrix substrate in such a manner that the surface of the color filter substrate having the color filter thereon can be opposed to the surface of the active matrix substrate on which the liquid crystal 106 has been dropped. Next, the superimposed structure of the color filter substrate and the active matrix substrate is taken out to the atmosphere. As a result, the regions 104 and 105 are sealed air-tight, thereby being made a negative pressure. In particular, the region 104 not filled with the liquid crystal 106 is evacuated, so that the atmospheric pressure applied on the region 104 causes the active matrix substrate and the color filter substrate to be pressed toward each other. On the other hand, the spacers formed on the color filter substrate prevent the distance (hereinafter, the gap) between the active matrix substrate and the color filter substrate from becoming less than a specified value. This results in the formation of a uniform-thick liquid crystal layer between the active matrix substrate and the color filter substrate.

Next, the sealing members 102 and 103 are hardened by being exposed to ultraviolet radiation. This enables the active matrix substrate and the color filter substrate to be laminated to each other. Then, the active matrix substrate and the color filter substrate are cut along cutting lines 107 set along the sealing member 102 on the region 104. As a result, the region including the sealing member 103 is cut off to form a liquid crystal display device.

Also, Japanese Patent Publication No. 2001-281678, for example, discloses a technique in which the height of the spacers formed on the color filter substrate is measured, the optimum amount of the liquid crystal 106 to be filled in the region 105 is calculated based on the spacer height, and the dispenser for the liquid crystal 106 is controlled based on this calculated amount. This patent document describes, as its method for controlling the drop amount, selecting the number of drop shots, and preparing two dispensers having different numbers of drops per shot from each other and selecting the dispenser to drop the last shot.

However, the aforementioned conventional techniques have the following problems. In the conventional method for manufacturing the liquid crystal display device shown in FIG. 1, the two sealing members 102 and 103 are formed around the display region. This forces to use of glass substrates much larger than the final products of the active matrix substrate and the color filter substrate, thereby causing a cost increase.

However, in the absence of the sealing member 103, when the superimposed structure of the color filter substrate and the active matrix substrate formed in a vacuum is taken out to the atmosphere, the vacuum region 104 is not formed. Therefore, the active matrix substrate and the color filter substrate are laminated only by the negative pressure of the region 105 filled with the liquid crystal 106. This makes the force to press these substrates inward insufficient, thereby causing the gap between the substrates to be non-uniform. In particular, the gap in the peripheral areas of the region 105 is liable to be non-uniform. A gap larger than the designed value causes images displayed on the liquid crystal display device to be yellowish. In contrast, a gap smaller than the designed value causes the images to be bluish. Thus, a non-uniform gap leads to degradation in display quality.

SUMMARY OF THE INVENTION

An object of the present invention is to provide a method for manufacturing a liquid crystal display device which has a low production cost and can form a uniform gap between the substrates.

A method for manufacturing a liquid crystal display device according to the present invention comprises: forming a sealing member having a shape like a rectangular frame in such a manner as to surround a display region on a surface of a first substrate; dropping a plurality of droplets of liquid crystal to each of dropping points; superimposing, in a vacuum, a second substrate on the surface of the first substrate that has been filled with the liquid crystal; and taking the superimposed structure of the first substrate and the second substrate out to an atmosphere. And, the positions of the dropping points are arranged in a matrix having m ($m \geq 3$) rows and n ($n \geq 3$) columns in the region surrounded by the sealing member. If four first lines are assumed to connect the dropping points arranged at outermost first row, the dropping points arranged at outermost m-th row, the dropping points arranged at outermost first column and the dropping points arranged at outermost n-th column, respectively, four second lines are assumed to connect the dropping points arranged at second row inner side of the first row, the dropping points arranged at (m-1)-th row inner side of the m-th row, the dropping points arranged at second column inner side of the first column and the dropping points arranged at (n-1)-th column inner side of the n-th column, respectively, and four third lines are assumed to be arranged between the first and second lines so as to be equidistant from each of them to divide the region surrounded by the sealing member into nine divided regions by the third lines, one dropping point is positioned in each of four corner divided regions by a density of 0.83 to 1.17 times the density of the dropping points in the whole region surrounded by the sealing member, and the dropping points positioned in each of four edge divided regions except for the four corner divided regions and central divided region has a density of 0.9 to 1.1 times the density of the dropping points in the whole region.

In the present invention, the liquid crystal can be uniformly dropped in the region surrounded by the sealing member by setting the dropping points as described above and dropping the liquid crystal in the dropping points by the specified amount. This allows the liquid crystal to be uniformly filled in this region by the negative pressure only of the region surrounded by the sealing member, thereby forming a uniform gap between the first substrate and the second substrate.

The method for manufacturing the liquid crystal display device according to the present invention, may further comprises: forming a spacer on one of a surface of the first substrate that is opposed to the second substrate and a surface of the second substrate that is opposed to the first substrate; measuring a height of the spacer; and determining an amount of the liquid crystal to be filled on the basis of the height of the spacer before the dropping. The density of the dropping points in each of the edge divided regions is adjusted to be 0.9 to 1.1 times the density of the dropping points in the whole region surrounded by the sealing member and the density of the dropping points in each of the corner divided regions is adjusted to be 0.83 to 1.17 times the density of the dropping points in the whole region by deleting at least one dropping point from the dropping points arranged in the form of a matrix, adding at least one additional dropping point to the dropping points arranged in the form of a matrix, or maintaining the number of the dropping points arranged in the form of a matrix, in the dropping.

This enables the amount of the liquid crystal to be filled to be adjusted based on the spacer height, thereby forming a uniform gap even when the spacers have different heights.

Another method for manufacturing a liquid crystal display device according to the present invention comprises: forming a spacer on a surface of a first substrate; measuring a height of the spacer; determining an amount of liquid crystal to be filled on the basis of the height of the spacer before the dropping; forming a sealing member in a form of a rectangular frame so as to surround a display region on a surface of a second substrate; dropping a plurality of droplets of liquid crystal to each of dropping points; superimposing, in a vacuum, the surface of the first substrate that has the spacer thereon on the surface of the second substrate that has been filled with the liquid crystal; and taking the superimposed structure of the first substrate and the second substrate out to an atmosphere.

And the positions of the dropping points are arranged in a matrix having m (m≧3) rows and n (n≧3) columns in the region surrounded by the sealing member. If four first lines are assumed to connect the dropping points arranged at outermost first row, the dropping points arranged at outermost m-th row, the dropping points arranged at outermost first column and the dropping points arranged at outermost n-th column, respectively, four second lines are assumed to connect the dropping points arranged at second row inner side of the first row, the dropping points arranged at (m-1)-th row inner side of the m-th row, the dropping points arranged at second column inner side of the first column and the dropping points arranged at (n-1)-th column inner side of the n-th column, respectively, and four third lines are assumed to be arranged between the first and second lines so as to be equidistant from each of them to divide the region surrounded by the sealing member into nine divided regions by the third lines, one dropping point is positioned in each of four corner divided regions by a density of 0.83 to 1.17 times the density of the dropping points in the whole region surrounded by the sealing member, and the dropping points positioned in each of four edge divided regions except for the four corner divided regions and central divided region has a density of 0.9 to 1.1 times the density of the dropping points in the whole region.

The densities of the dropping points may be adjusted by deleting at least one dropping point from the dropping points arranged in the form of a matrix, adding at least one additional dropping point to the dropping points arranged in the form of a matrix, or maintaining the number of the dropping points arranged in the form of a matrix based on the determined amount of the liquid crystal to be filled.

In the present invention, the liquid crystal can be uniformly dropped in the region surrounded by the sealing member by setting the dropping points as described above and by dropping the liquid crystal in the dropping points by the specified amount. This allows the liquid crystal to be uniformly filled in this region by the negative pressure only of the region surrounded by the sealing member, thereby forming a uniform gap between the first substrate and the second substrate when taking the structure out to the atmosphere. In addition, this enables the amount of the liquid crystal to be filled to be adjusted based on the spacer height, thereby forming a uniform gap even when the spacers have different heights.

In the present invention, the second substrate may have a plurality of the display regions, the determination of the amount of the liquid crystal to be filled may be done for each of the plurality of display regions, the number of the dropping points may be determined on the basis of the amount of the liquid crystal to be filled that has been determined for each of the plurality of display regions, and the superimposed structure may be cut into the plurality of display regions after being taken out to an atmosphere. This makes it possible to manufacture a plurality of liquid crystal display devices from a pair of the first and second substrates, thereby improving the productivity of liquid crystal display devices.

Further another method for manufacturing a liquid crystal display device according to the present invention comprises: forming a sealing member in a form of a rectangular frame so as to surround a display region on a surface of a first substrate; dropping a plurality of droplets of liquid crystal to each of dropping points; superimposing, in a vacuum, the surface of the first substrate that has the spacer thereon on the surface of the second substrate that has been filled with the liquid crystal; and taking the superimposed structure of the first substrate and the second substrate out to an atmosphere. The positions of the dropping points are arranged in a matrix having m (m≧3) rows and n (n≧3) columns in the region surrounded by the sealing member. And if four first lines are assumed to connect the dropping points arranged at outermost first row, the dropping points arranged at outermost m-th row, the dropping points arranged at outermost first column and the dropping points arranged at outermost n-th column, respectively, four second lines are assumed to connect the dropping points arranged at second row inner side of the first row, the dropping points arranged at (m-1)-th row inner side of the m-th row, the dropping points arranged at second column inner side of the first column and the dropping points arranged at (n-1)-th column inner side of the n-th column, respectively, and four third lines are assumed to be arranged between the first and second lines so as to be equidistant from each of them to divide the region surrounded by the sealing member into nine divided regions by the third lines, one dropping point is positioned in each of four corner divided regions by a density of 0.83 to 1.17 times the density of the dropping points in the whole region surrounded by the sealing member, and the dropping points positioned in each of four edge divided regions except for the four corner divided regions and central divided region has a density of 0.9 to 1.1 times the density of the dropping points in the whole region. The densities of the dropping points are adjusted by deleting at least one dropping point from the dropping points arranged in the form of a matrix, adding at least one additional dropping point to the dropping points arranged in the form of a matrix, or maintaining the number of the dropping points arranged in the form of a matrix. The amount of the liquid crystal to be filled is determined on the basis of height of a spacer formed on the first substrate.

According to the present invention, the positions to drop the liquid crystal are determined based on the dropping points which are predetermined by the aforementioned method. Therefore, once the dropping points are determined based on the spacer height, a plurality of liquid crystal display devices can be manufactured without measuring the spacer height of each device, unless the spacer height greatly varies from device to device. This enables the efficient manufacture of liquid crystal display devices having a uniform gap.

According to the present invention, a uniform gap can be formed between the first substrate and the second substrate without the formation of double sealing members. This makes it possible to manufacture liquid crystal display devices with excellent display quality at low cost.

BRIEF DESCRIPTION OF THE DRAWINGS

FIG. 5 is a graph showing the influence of a variation in the distribution of dropping points on a variation in the gap, in which the horizontal axis indicates the ratio of the density of the dropping points in the edge divided regions and the corner divided regions to the density of the dropping points in the region as a whole surrounded by the sealing member, while the vertical axis indicates the amount of change in the gap in the peripheral areas of the region surrounded by the sealing member.

DATEILED DESCRIPTION OF THE PREFERRED EMBODIMENTS

Figure 2:
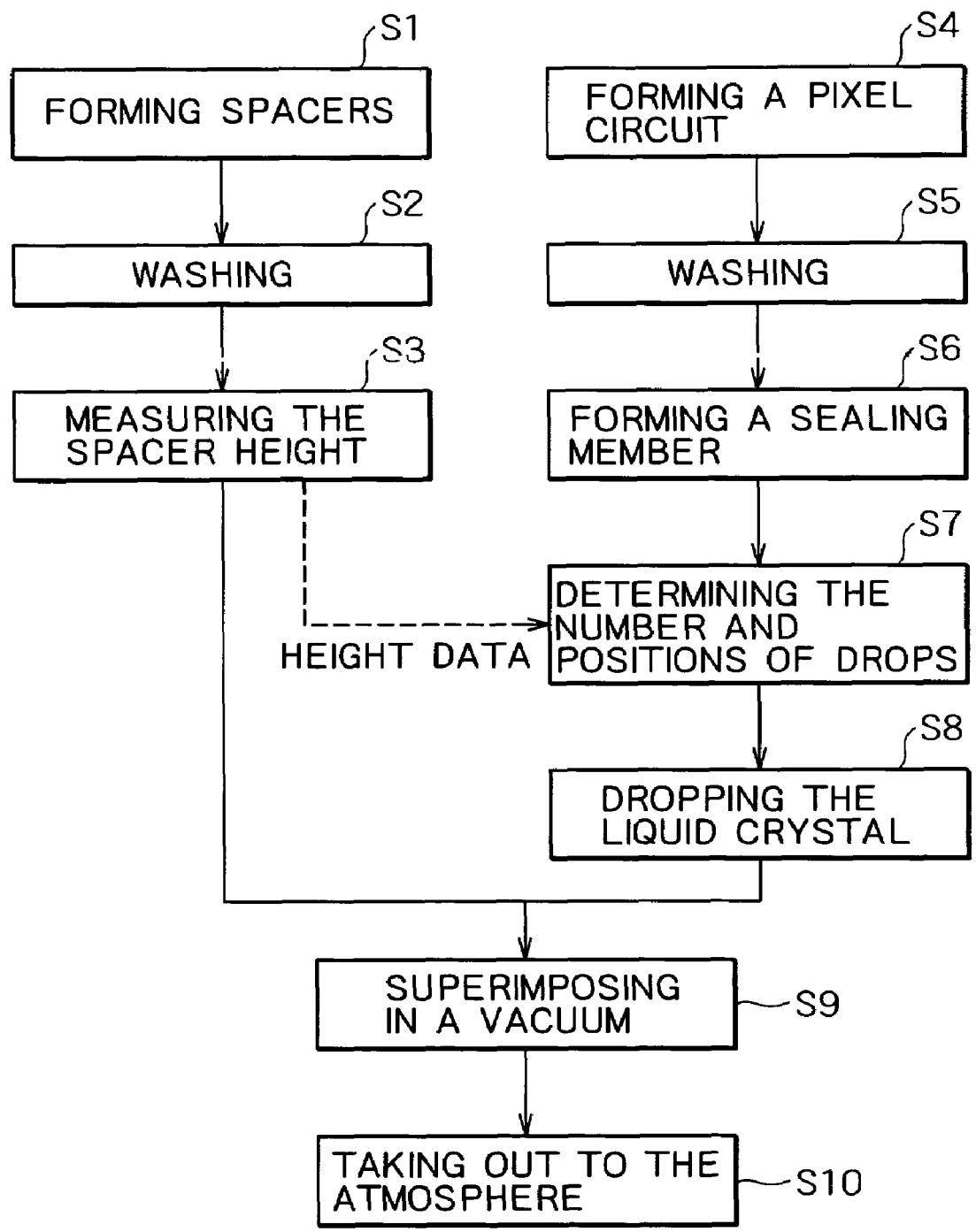
FIG. 2 is a flowchart depicting a method for manufacturing a liquid crystal display device according to a first embodiment of the present invention.
Figure 3:
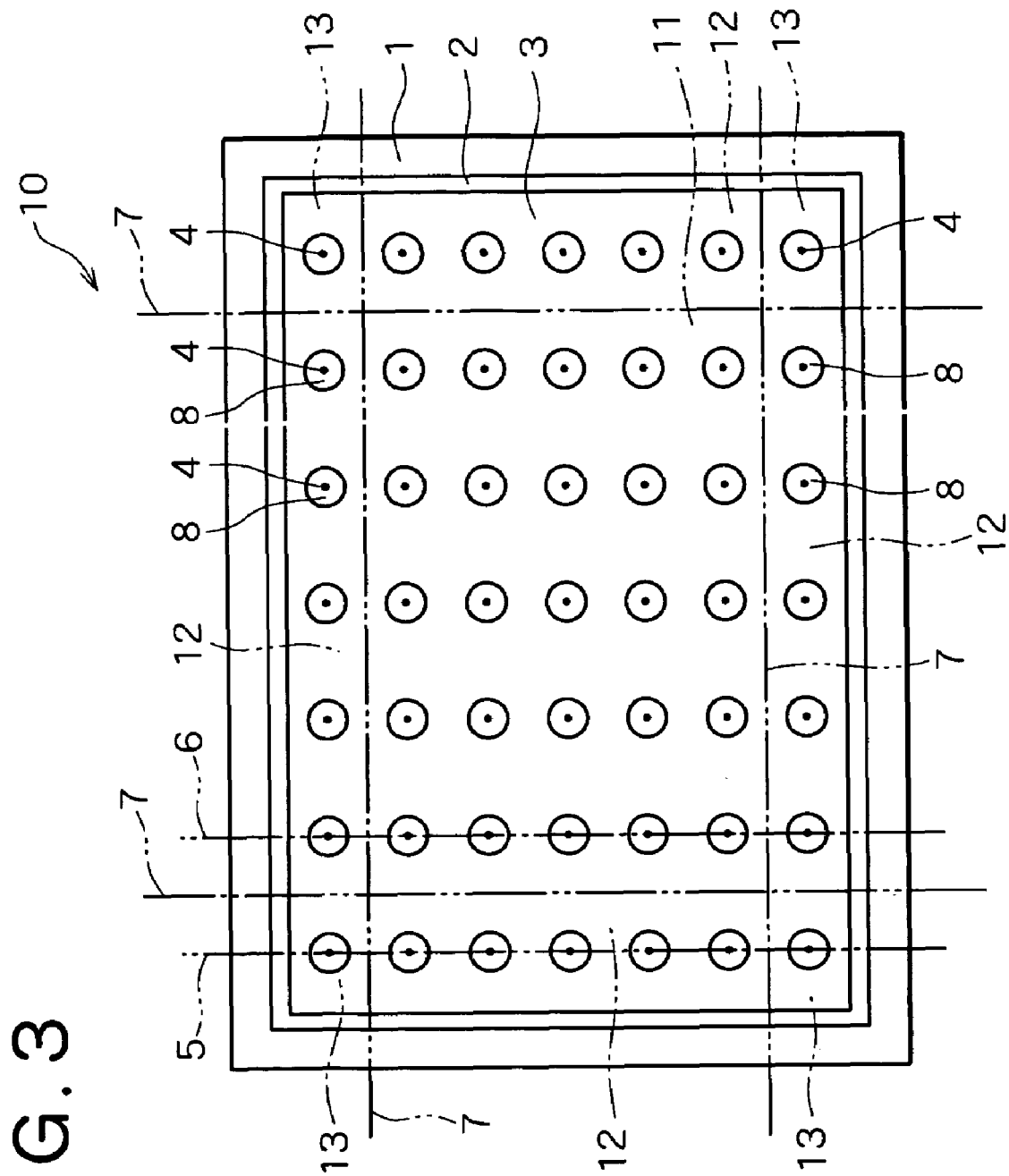
FIG. 3 is a plan view showing the method for manufacturing the liquid crystal display device according to the first embodiment, in which an active matrix substrate is in the step of being manufactured when the number of dropping points is neither increased nor decreased.
Figure 4:
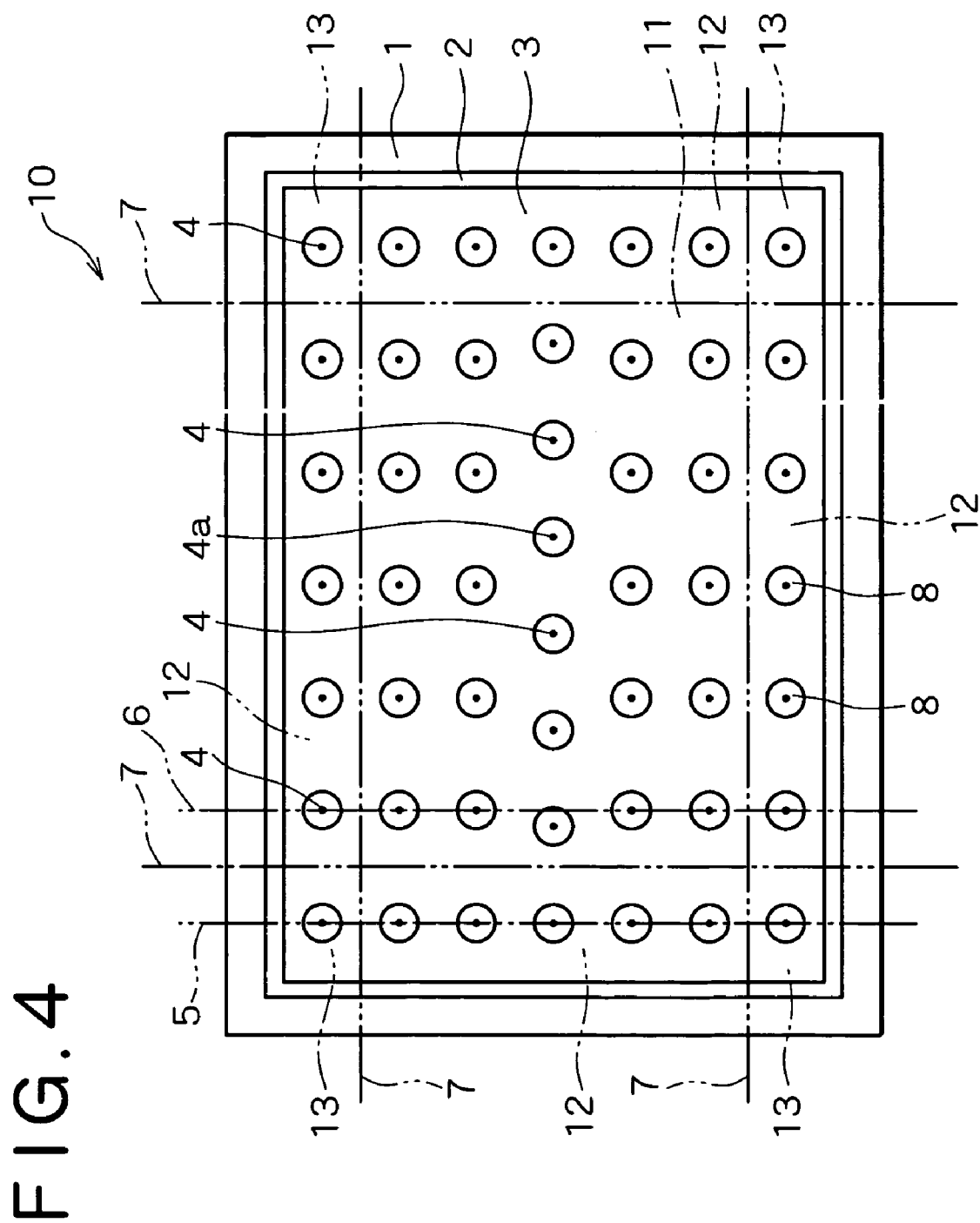
FIG. 4 is a plan view showing the method for manufacturing the liquid crystal display device according to the first embodiment, in which the active matrix substrate is in the step of being manufactured when one additional dropping point is added.

The embodiments of the present invention will be described specifically as follows with reference to accompanying drawings. First, the first embodiment of the present invention will be described as follows. FIG. 2 is a flowchart depicting a method for manufacturing a liquid crystal display device according to the present embodiment of the present invention. FIGS. 3 and 4 are plan views showing the method for manufacturing the liquid crystal display device according to the present embodiment: FIG. 3 shows an active matrix substrate in the step of being manufactured when the number of dropping points is neither increased nor decreased, and FIG. 4 shows the active matrix substrate in the step of being manufactured when one additional dropping point is added.

First, as shown at Step S1 of FIG. 2, a transparent insulating substrate such as a glass substrate is prepared, and a color filter (CF), a black matrix and the like are formed on the surface of the glass substrate so as to form a color filter substrate (not shown). On the color filter, a plurality of pillar-like spacers are formed. As shown at Step S2, the color filter substrate is washed. As shown at Step S3, the average height of the spacers formed on the color filter substrate is measured.

Figure 1:
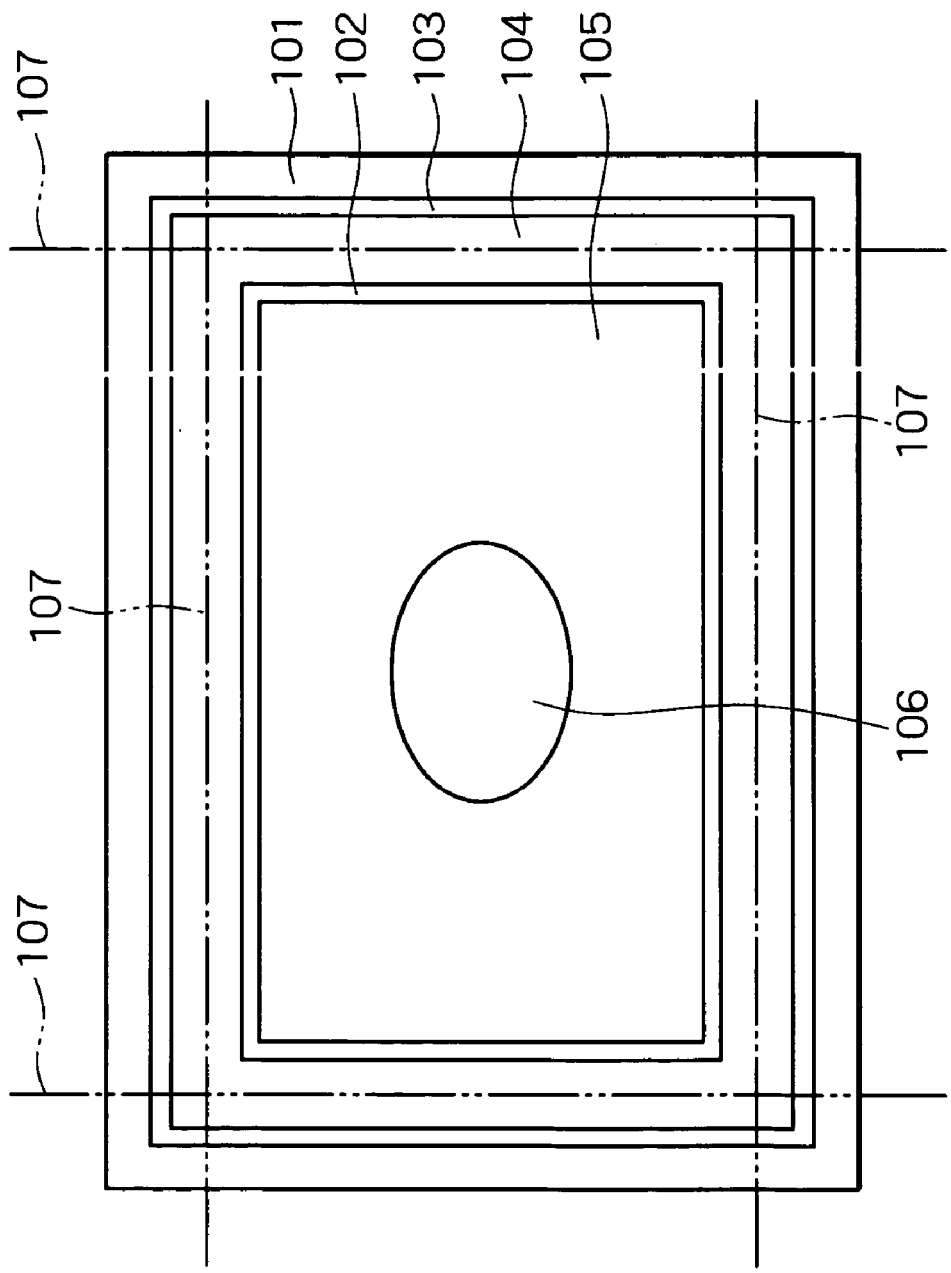
FIG. 1 is a plan view showing a conventional method for manufacturing a liquid crystal display device by an ODF process.

On the other hand, as shown at Step S4 of FIG. 2 and FIG. 3, scan lines, data lines and pixel circuits (not shown) consisting of TFTs and the like are formed on a surface of another glass substrate 1 so as to form an active matrix substrate 10. Next, as shown at Step S5, the active matrix substrate 10 is washed. As shown at Step S6, on the surface of the active matrix substrate 10 that has the pixel circuit thereon, a sealing member 2 made of an ultraviolet curable resin is formed. The sealing member 2 is formed in the shape of a rectangular frame in the region of the surface of the active matrix substrate 10 that has the pixel circuit thereon, that is, in such a manner as to surround the display region of the liquid crystal display device. Unlike the conventional method for manufacturing the liquid crystal display device having the sealing member 103 (refer to FIG. 1), the sealing member 2 is the only sealing member.

As shown at Step S7 of FIG. 2, in a region 3 inside the sealing member 2 on the surface of the active matrix substrate 10, the number and positions to drop liquid crystal are determined. The determination will be detailed as follows. First, in the region 3 surrounded by the sealing member 2, nine or more dropping points 4 are arranged in the form of a matrix of at least (3×3). More specifically, allowing m and n to be integers of 3 or greater, (m×n) dropping points 4 are arranged in the form of a matrix with m rows and n columns.

The values of m and n are predetermined based on the size of the region 3. For example, in the case of an 18-inch liquid crystal display device, m and n are made 8 and 10, respectively. In the present embodiment, as shown in FIG. 3, m and n are both made 7. The amount of liquid crystal to be filled in the region 3 is previously calculated based on a designed value of the spacer height, and the filling amount is divided by the number of dropping points, that is, (m×n), thereby calculating the amount of drops per shot. Then, the dispenser to drop the liquid crystal is adjusted so that the amount of drops per shot can be the calculated value.

Next, of this matrix, the dropping points 4 arranged in the outermost rows and columns (hereinafter, collectively referred to as columns) are connected to assume straight lines 5. There are a total of four straight lines 5 which form the sides of the rectangular region including the dropping points 4 arranged in the form of a matrix. This is, four straight lines 5 are assumed to connect the dropping points 4 arranged at outermost first row, the dropping points 4 arranged at outermost m-th row, the dropping points 4 arranged at outermost first column and the dropping points 4 arranged at outermost n-th column, respectively.

Next, of the matrix, the dropping points 4 arranged in the second outermost columns are connected to assume straight lines 6. The number of straight lines 6 can be two to four according to the number of the dropping points. For example, when m and n both are 4 or greater, the number of the straight lines 6 is four. This is, the four straight lines 6 are assumed to connect the dropping points 4 arranged at second row inner side of the first row, the dropping points 4 arranged at (m-1)-th row inner side of the m-th row, the dropping points 4 arranged at second column inner side of the first column and the dropping points 4 arranged at (n-1)-th column inner side of the n-th column, respectively. Each straight line 6 is parallel and adjacent to the corresponding one of the straight lines 5.

Next, straight lines 7 are imagined to be equidistant from the straight lines 5 and 6, which are adjacent to each other. The total number of the straight lines 7 is four, and these four straight lines 7 divide the region 3 into nine regions. More specifically, the region 3 is divided into: a central divided region 11 surrounded by four straight lines 7; four edge divided regions 12 each surrounded by three straight lines 7 and one side of sealing member 2; and four corner divided regions 13 each surrounded by two straight lines 7 and two sides of sealing member 2. Thus, the central divided region 11 includes {(m-2)×(n-2)} dropping points 4, two of the edge divided regions 12 each include (m-2) dropping points 4, the other two edge divided regions 12 each include (n-2) dropping points 4, and the corner divided regions 13 each include one dropping point 4.

The positions of the dropping points 4 are determined so that the density of the dropping points 4 in the four edge divided regions 12, that is, the number of the dropping points 4 per unit area in the four edge divided regions 12 as a whole can be within ±10% or 0.9 to 1.1 times the density of the dropping points 4 in the region 3 as a whole, and that the density of the dropping points 4 in the four corner divided regions 13 can be within ±17% or 0.83 to 1.17 times the density of the dropping points 4 in the region 3 as a whole.

On the other hand, the optimum amount of the liquid crystal to be filled in the region 3 is calculated based on the data of the spacer height measured at Step S3. The optimum amount is divided by the drop amount per shot of the dispenser having a pre-adjusted optimum amount, thereby calculating the optimum number of drops. As a result, when the optimum number of drops is (m×n), the aforementioned number of dropping points 4 arranged in the form of a matrix of (m×n) is maintained. When the optimum number of drops is larger than (m+n), that is, when L is an integer not smaller than 1 and the optimum number of drops is (m×n)+L, L additional dropping points 4a are added to the aforementioned dropping points 4 arranged in the form of a matrix m×n). The addition of the dropping points 4a is performed in such a manner that the density of the dropping points 4 and 4a in the edge divided regions 12 can be 0.9 to 1.1 times the density of the dropping points 4 and 4a in the region 3 as a whole, and that the density of the dropping points 4 and 4a in the corner divided regions 13 can be 0.83 to 1.17 times the density of the dropping points 4 and 4a in the region 3 as a whole.

FIG. 4 shows a case where one dropping point 4a is newly added to 49 dropping points 4 arranged in the form of a matrix (7×7) shown in FIG. 3. The dropping point 4a is added in the central divided region 11. The positions of the dropping points 4 are adjusted as necessary so that the density of the dropping points in each region can satisfy the aforementioned relationship. More specifically, the positions of the dropping points 4 can be adjusted to displace the positions of the straight lines 5 and 6, and consequently the positions of the straight lines 7, thereby changing the areas of the edge divided regions 12 and the corner divided regions 13, and eventually making the density of the dropping points in each region satisfy the aforementioned relationship.

When the optimum number of drops is less than (m×n), that is, (m×n)-L, L dropping points 4 are deleted from the aforementioned dropping points 4 arranged in the form of a matrix of (m×n). The deletion of the dropping points 4 is performed in such a manner that the density of the dropping points 4 in the edge divided regions 12 can be 0.9 to 1.1 times the density of the dropping points 4 in the region 3 as a whole, and that the density of the dropping points 4 in the corner divided regions 13 can be 0.83 to 1.17 times the density of the dropping points 4 in the region 3 as a whole. In other words, the positions of the dropping points 4 are changed as necessary so as to change the area of each region. Thus, the number and positions of the dropping points are determined based on the spacer height.

As shown at Step S8 of FIG. 2 and FIG. 3, the liquid crystal 8 is dropped shot by shot from a dispenser to each of the dropping points 4 (and 4a) determined at Step S7. Thus, the dropping points 4 (and 4a) become the dropping points of the liquid crystal. At Step S9, in a vacuum, the color filter substrate is superimposed on the active matrix substrate in such a manner that the surface of the color filter substrate that has the color filter thereon can be opposed to the surface of the active matrix substrate 10 in which the liquid crystal 8 has been dropped. As shown at Step S10, the superimposed structure of the color filter substrate and the active matrix substrate is taken out to the atmosphere. As a result, the region 3 is sealed air-tight, thereby being made a negative pressure. On the other hand, the spacers formed on the color filter substrate prevent the distance (the gap) between the active matrix substrate and the color filter substrate from becoming less than a specified value. This results in the formation of a uniform-thick liquid crystal layer between the active matrix substrate and the color filter substrate. Next, the sealing member 2 is hardened by being exposed to ultraviolet radiation. This enables the active matrix substrate and the color filter substrate to be laminated to each other. As a result, a liquid crystal display device is manufactured.

The following is a description of the reason to limit values in each structural component of the present invention.

The density of the dropping points in each of the edge divided region is 0.9 to 1.1 times the density of the dropping points in the whole region surrounded by the sealing member, and the density of the dropping points in each of the corner divided regions is 0.83 to 1.17 times the density of the dropping points in the whole region.

FIG. 5 is a graph showing the influence of a variation in the distribution of dropping points on a variation in the gap, in which the horizontal axis indicates the ratio of the density of the dropping points in the edge divided regions and the corner divided regions to the density of the dropping points in the region as a whole surrounded by the sealing member, while the vertical axis indicates the amount of change in the gap in the peripheral areas of the region surrounded by the sealing member. In the liquid crystal display device, a change of 2% or more in luminance in the display region is recognized as unevenness of luminance. The larger the gap changes, the larger the luminance changes. The amount of change in the gap that causes a change of 2% in luminance is 1%. The gap is prone to change in the peripheral areas of the region where the liquid crystal layer is formed. Therefore, in order to prevent unevenness of luminance, the amount of change in the gap in the peripheral areas is required to be not more than 1%. Note that "the peripheral areas" mean the edge divided regions 12 and the corner divided regions 13 shown in FIG. 3, and the amount of change in the peripheral gap indicates the value obtained by subtracting the gap in the central divided region 11 from the gap in the edge divided regions 12 or the corner divided regions 13 and then by dividing the balance by the gap of the central divided region 11.

As shown in FIG. 5, in order to set the amount of change in the peripheral gap to within ±1%, that is, −1 to +1%, it is necessary that the density of the dropping points (dropping points) in the edge divided regions 12 should be 0.9 to 1.1 times the density of the dropping points in the region 3 as a whole surrounded by the sealing member, and that the density of the dropping points in the corner divided regions 13 should be 0.83 to 1.17 times the density of the dropping points in the region 3 as a whole.

In the present embodiment, the density of the dropping points in the edge divided regions 12 is made within ±10% or 0.9 to 1.1 times the density of the dropping points in the region 3 as a whole, and the density of the dropping points in the corner divided regions 13 is made within ±17% or 0.83 to 1.17 times the density of the dropping points in the region 3 as a whole. This allows the liquid crystal 8 to be dropped uniformly in the region 3. As a result, the gap between these substrates can be uniformed only with the negative pressure from the region 3, without combining the active matrix substrate and the color filter substrate by a large force with double sealing members. This makes it possible to manufacture a liquid crystal display device excellent in display quality with no unevenness of display. In addition, not having to form double sealing members can eliminate the necessity of preparing substrates much larger than the final products used in the liquid crystal display device, and can also save the material of the sealing member, thereby reducing production cost.

In the present embodiment, the number of drops is determined by measuring the spacer height and then calculating the optimum amount of liquid crystal to be filled based on the measured spacer height. This can make the liquid crystal layer have a uniform thickness by adjusting the number of drops, thereby adjusting the amount of liquid crystal to be filled even if the spacer height varies. It is possible to adjust the amount of liquid crystal to be filled by adjusting the amount of drops per shot from the dispenser; however, adjusting the amount of drops from the dispenser to a desired value requires a lot of time and trouble to determine various requirements of the dispenser, thereby greatly decreasing the productivity of liquid crystal display devices. It is also possible, as described in the aforementioned Japanese Patent Publication No. 2001-281678, to prepare a plurality of dispensers having different amounts of drops per shot from each other; however, this increases the equipment cost. In contrast, in the present embodiment, the amount of liquid crystal to be filled is controlled by adjusting the number of drops, which neither increases the equipment cost nor decreases the productivity. Furthermore, the position of each dropping point is adjusted so as to satisfy the aforementioned requirements, thereby allowing the liquid crystal to have a uniform thickness.

A second embodiment of the present invention will be described as follows. The present embodiment differs from the first embodiment in that the determination of the number and positions of dropping points based on the measurement of the spacer height and its measurement results is performed offline. The spacer height has a comparatively large variation from lot to lot of color filters. The variation is comparatively small among liquid crystal display devices using color filters from the same lot. This means that if the number and positions of dropping points of the liquid crystal are determined by measuring the spacer height of each lot of color filters, it is possible to omit measurement of the spacer height and to determine the dropping points of liquid crystal in the manufacture process of each of several tens of liquid crystal display devices that are manufactured with color filters from the same lot.

More specifically, when the lot of color filters changes, the spacer height is measured. Then, based on the measurement results, the number and positions of the dropping points 4 (and 4a) are determined as shown in FIGS. 3 or 4 by the method described at Step S7 of FIG. 2. After this, liquid crystal display devices are manufactured with color filters from this lot. In this case, without performing the processes shown at Steps S3 and S7 of FIG. 2, the liquid crystal is dropped by a prescribed amount in the predetermined dropping points at Step S8. The other processes in the manufacturing method in the present embodiment are identical to those in the first embodiment.

In the present embodiment, the number and positions of the dropping points are determined by measuring the spacer height of each lot of color filters, so that the measurement of the spacer height and the determination of dropping points are omitted in the manufacture process of liquid crystal display devices that are manufactured with color filters from the same lot. This can improve the productivity of liquid crystal display devices, compared with the first embodiment. The other effects in the present embodiment are identical to those in the first embodiment.

Although the present embodiment shows a case where dropping points are determined for each lot of color filters, the present invention is not limited to this case, and it is possible to measure the spacer height and to determine dropping points based on the measured spacer height every time a group of liquid crystal display devices which are assumed to have a comparatively small variation in spacer height is manufactured.

A third embodiment according to the present invention will be described as follows. The present embodiment shows a case where the first embodiment is applied to the production of multiple substrates. The production of multiple substrates is a method of manufacturing a plurality of liquid crystal display devices from one pair of glass substrates. A method for manufacturing the liquid crystal display device according to the present embodiment will be described as follows. The same processes as those in the first embodiment will not be detailed again.

First, at Step S1 of FIG. 2, a plurality of regions which are to be color filter substrates in a later process (hereinafter, the CF substrate regions) are formed on a glass substrate. On each CF substrate region, a black matrix, a color filter and the like are formed. The color filter is provided with spacers. At Step S2, the substrate is washed. At Step S3, the spacer height is measured to find its mean value for each of the CF substrate region.

On the other hand, in the process of Step S4, a plurality of regions which are to be active matrix substrates in a later process (hereinafter, the TFT substrate regions) are set on another glass substrate, and a pixel circuit and the like are formed on each of the TFT substrate regions. Each of the TFT substrate regions is set so as to be overlapped with the corresponding one of the CF substrate regions when these glass substrates are laminated to each other at a vacuum superimposing process of Step S9. More specifically, the number of the TFT substrate regions is made equal to the number of the CF substrate regions, and the relative positional relationship between the plurality of TFT substrate regions is an inversion of the relative positional relationship between the plurality of CF substrate regions.

At Step S5 the substrate is washed, and at Step S6 a sealing member is formed on each of the TFT substrate regions. At Step S7 the amount of liquid crystal to be filled in the TFT substrate regions which are intended to be superimposed with the CF substrate regions at Step S9 is determined based on the mean value of the spacer height of each of the CF substrate regions calculated at Step S3. Based on the determined amount, the number and positions of the dropping points of liquid crystal are determined for each of the TFT substrate regions. The method for adjusting the number and positions of the dropping points is the same as the method described in the first embodiment. At Step S8, the liquid crystal is dropped in the dropping points determined at Step S7.

At Step S9, the glass substrate having the aforementioned CF substrate regions thereon is superimposed in a vacuum with the glass substrate having the aforementioned TFT substrate regions thereon. The superimposing is done in such a manner as to match each of the CF substrate regions to the corresponding one of the TFT substrate regions. At Step S10, the substrates are taken out to the atmosphere. After this, the aforementioned pair of glass substrates is cut into a plurality of color filter substrates and a plurality of active matrix substrates, and as a result, the superimposed pair of glass substrates is cut into a plurality of liquid crystal display devices. The other structures of the present embodiment are equal to those of the first embodiment.

The present embodiment makes it possible to manufacture a plurality of liquid crystal display devices at one time, thereby improving the productivity of liquid crystal display devices. Furthermore, the mean value of the spacer height is calculated for each liquid crystal display device, and the number and positions of dropping points of the liquid crystal are adjusted for each liquid crystal display device, based on the calculated spacer height. This can control the amount of liquid crystal to be filled at an optimum level for each liquid crystal display device. The effects of the present embodiment other than those described above are identical to those of the first embodiment.

What is claimed is:

1. A method for manufacturing a liquid crystal display device comprising:
   forming a sealing member having a shape like a rectangular frame in such a manner as to surround a display region on a surface of a first substrate;
   dropping a plurality of droplets of liquid crystal to each of dropping points, the positions of said dropping points being arranged in a matrix having m (m≧3) rows and n (n≧3) columns in the region surrounded by said sealing member, and if four first lines are assumed to connect said dropping points arranged at outermost first row, said dropping points arranged at outermost m-th row, said dropping points arranged at outermost first column and said dropping points arranged at outermost n-th column, respectively, four second lines are assumed to connect said dropping points arranged at second row inner side of said first row, said dropping points arranged at (m-1)-th row inner side of said m-th row, said dropping points arranged at second column inner side of said first column and said dropping points arranged at (n-1)-th column inner side of said n-th column, respectively, and four third lines are assumed to be arranged between said first and second lines so as to be equidistant from each of them to divide said region surrounded by said sealing member into nine divided regions by said third lines, one dropping point is positioned in each of four corner divided regions by a density of 0.83 to 1.17 times the density of said dropping points in the whole region surrounded by said sealing member, and said dropping points positioned in each of four edge divided regions except for said four corner divided regions and central divided region has a density of 0.9 to 1.1 times the density of said dropping points in the whole region;
   superimposing, in a vacuum, a second substrate on the surface of the first substrate that has been filled with said liquid crystal; and
   taking the superimposed structure of the first substrate and the second substrate out to an atmosphere.

2. The method for manufacturing the liquid crystal display device according to claim 1, further comprising:
   forming a spacer on one of a surface of said first substrate that is opposed to said second substrate and a surface of said second substrate that is opposed to said first substrate;
   measuring a height of said spacer; and
   determining an amount of said liquid crystal to be filled on the basis of said height of said spacer before said dropping,
   wherein said density of said dropping points in each of said edge divided regions is adjusted to be 0.9 to 1.1 times the density of said dropping points in the whole region surrounded by said sealing member and the density of said dropping points in each of said corner divided regions is adjusted to be 0.83 to 1.17 times the density of said dropping points in the whole region by deleting at least one dropping point from said dropping points arranged in the form of a matrix, adding at least one additional dropping point to said dropping points arranged in the form of a matrix, or maintaining the number of said dropping points arranged in the form of a matrix, in said dropping.

3. The method for manufacturing the liquid crystal display device according to claim 2, wherein the number of said dropping points is adjusted by adjusting the number of said dropping points in a central divided region surrounded by four of said third lines.

4. The method for manufacturing a liquid crystal display device according to claim 1, wherein the positions of said dropping points are determined before said forming said sealing member on the surface of said first substrate.

5. A method for manufacturing a liquid crystal display device comprising:
   forming a spacer on a surface of a first substrate;
   measuring a height of said spacer,
   determining an amount of liquid crystal to be filled on the basis of said height of said spacer before said dropping;
   forming a sealing member in a form of a rectangular frame so as to surround a display region on a surface of a second substrate;

dropping a plurality of droplets of liquid crystal to each of dropping points, the positions of said dropping points being arranged in a matrix having m (m≧3) rows and n (n≧3) columns in the region surrounded by said sealing member, and if four first lines are assumed to connect said dropping points arranged at outermost first row, said dropping points arranged at outermost m-th row, said dropping points arranged at outermost first column and said dropping points arranged at outermost n-th column, respectively, four second lines are assumed to connect said dropping points arranged at second row inner side of said first row, said dropping points arranged at (m-1)-th row inner side of said m-th row, said dropping points arranged at second column inner side of said first column and said dropping points arranged at (n-1)-th column inner side of said n-th column, respectively, and four third lines are assumed to be arranged between said first and second lines so as to be equidistant from each of them to divide said region surrounded by said sealing member into nine divided regions by said third lines, one dropping point is positioned in each of four corner divided regions by a density of 0.83 to 1.17 times the density of said dropping points in the whole region surrounded by said sealing member, and said dropping points positioned in each of four edge divided regions except for said four corner divided regions and central divided region has a density of 0.9 to 1.1 times the density of said dropping points in the whole region, wherein said densities of said dropping points are adjusted by deleting at least one dropping point from said dropping points arranged in the form of a matrix, adding at least one additional dropping point to said dropping points arranged in the form of a matrix, or maintaining the number of said dropping points arranged in the form of a matrix based on the determined amount of said liquid crystal to be filled;

superimposing, in a vacuum, the surface of said first substrate that has the spacer thereon on the surface of said second substrate that has been filled with said liquid crystal; and taking the superimposed structure of said first substrate and said second substrate out to an atmosphere.

6. The method for manufacturing the liquid crystal display device according to claim 5, wherein the number of said dropping points is adjusted by adjusting the number of said dropping points in a central divided region surrounded by four of said third lines.

7. The method for manufacturing the liquid crystal display device according to claim 5, wherein said second substrate has a plurality of said display regions, said determination of the amount of said liquid crystal to be filled is done for each of said plurality of display regions, the number of said dropping points are determined on the basis of the amount of said liquid crystal to be filled that has been determined for each of said plurality of display regions, and said superimposed structure is cut into said plurality of display regions after being taken out to an atmosphere.

8. A method for manufacturing a liquid crystal display device comprising:

forming a sealing member in a form of a rectangular frame so as to surround a display region on a surface of a first substrate;

dropping a plurality of droplets of liquid crystal to each of dropping points, the positions of said dropping points being arranged in a matrix having m (m≧3) rows and n (n≧3) columns in the region surrounded by said sealing member, and if four first lines are assumed to connect said dropping points arranged at outermost first row, said dropping points arranged at outermost m-th row, said dropping points arranged at outermost first column and said dropping points arranged at outermost n-th column, respectively, four second lines are assumed to connect said dropping points arranged at second row inner side of said first row, said dropping points arranged at (m-1)-th row inner side of said m-th row, said dropping points arranged at second column inner side of said first column and said dropping points arranged at (n-1)-th column inner side of said n-th column, respectively, and four third lines are assumed to be arranged between said first and second lines so as to be equidistant from each of them to divide said region surrounded by said sealing member into nine divided regions by said third lines, one dropping point is positioned in each of four corner divided regions by a density of 0.83 to 1.17 times the density of said dropping points in the whole region surrounded by said sealing member, and said dropping points positioned in each of four edge divided regions except for said four corner divided regions and central divided region has a density of 0.9 to 1.1 times the density of said dropping points in the whole region, wherein the densities of the dropping points are adjusted by deleting at least one dropping point from said dropping points arranged in the form of a matrix, adding at least one additional dropping point to said dropping points arranged in the form of a matrix, or maintaining the number of said dropping points arranged in the form of a matrix, and the amount of said liquid crystal to be filled is determined on the basis of height of a spacer formed on said first substrate;

superimposing, in a vacuum, the surface of said first substrate that has the spacer thereon on the surface of said second substrate that has been filled with said liquid crystal; and taking the superimposed structure of said first substrate and said second substrate out to an atmosphere.

9. The method for manufacturing the liquid crystal display device according to claim 8, wherein the number of said dropping points is adjusted by adjusting the number of said dropping points in a central divided region surrounded by four of said third lines.

* * * * *